Aug. 18, 1953

C. H. SCHAMEL ET AL 2,649,330

AUTOMATIC REAR QUARTER WEATHER SEAL FOR
AUTOMOBILE BODIES WITH CONVERTIBLE TOPS

Filed June 29, 1951

INVENTORS
Clyde H. Schamel &
Harry A. Mackie.

BY Barnes, Kisselle, Laughlin & Raisch
ATTORNEYS.

Aug. 18, 1953    C. H. SCHAMEL ET AL    2,649,330
AUTOMATIC REAR QUARTER WEATHER SEAL FOR
AUTOMOBILE BODIES WITH CONVERTIBLE TOPS
Filed June 29, 1951                                                2 Sheets-Sheet 2

INVENTORS
Clyde H. Schamel &
Harry A. Mackie.
BY
Barnes, Kisselle, Laughlin & Raisch
ATTORNEYS.

Patented Aug. 18, 1953

2,649,330

UNITED STATES PATENT OFFICE 2,649,330

AUTOMATIC REAR QUARTER WEATHER SEAL FOR AUTOMOBILE BODIES WITH CONVERTIBLE TOPS

Clyde H. Schamel, Royal Oak, and Harry A. Mackie, Bloomfield Hills, Mich., assignors to General Motors Corporation, Detroit, Mich., a corporation of Delaware Application June 29, 1951, Serial No. 234,206

6 Claims. (Cl. 296—107)

This invention relates to convertible tops, and it is the object of the invention to provide an automobile body with a convertible top with a rear quarter seal which will automatically weatherseal the joint between the fabric and the top of the underbody or tonneau.

In the prior applications of Harry A. Mackie and Stanley Duluk, Serial No. 109,974, filed August 12, 1949, now Patent No. 2,569,724, granted October 2, 1951, and Kenneth E. Coppock and Jesse D. Compton, Serial No. 148,182, filed March 7, 1950, now abandoned, an automatic sealing arrangement between the fabric top and the top of the tonneau is provided by means of a wiping arm or a pressure arm connected with the bows so that when the top is raised this arm presses the fabric top material firmly against the belt rail. A sealing strip of rubber, foam rubber, or other soft material may be used between the arm and the top of the tonneau or belt rail if this seems desirable to smooth out the irregularities that may occur between the top material and the turned over upper edge of the tonneau.

As explained in these applications, these improvements are great advances over the present day arrangements for providing a seal along the belt rail at the rear quarter. The common practice prior to the improvement of these two applications has been to use an inverted V channel along the top of the tonneau at the rear quarter and provide a folded over or sewed on flap on the lower edge of the convertible top material and stretch the top material by hand, after the top has been raised, to hook the flap or the fold under the inverted channel. Another arrangement uses snap fasteners in connection with inclined dovetailed channels and then when the top is raised, these fasteners are manipulated by hand and snapped in place. Both of these operations are annoying and sometimes quite difficult when the top material has shrunk.

It is the object of the present invention to provide an improvement over the last two mentioned arrangements and to provide a new and different form of achieving the purpose sought in the Mackie and Duluk application and in the Coppock and Compton application.

Referring to the drawings.

Figure 1:
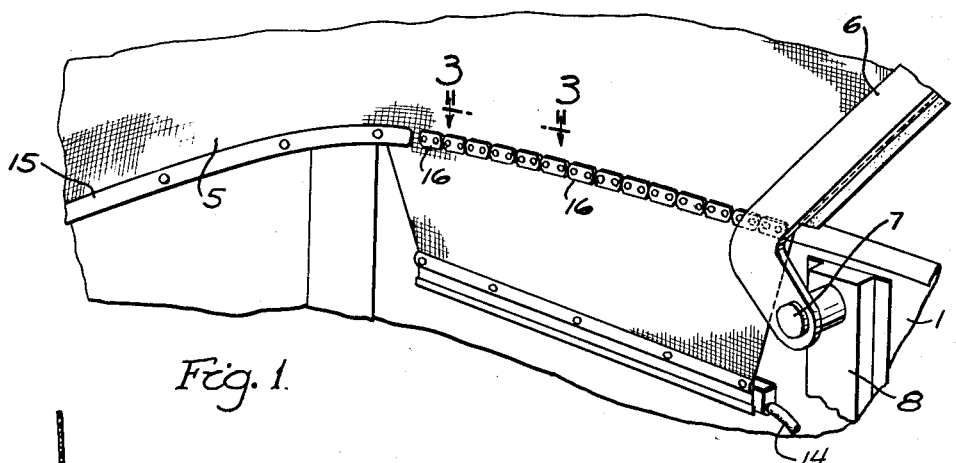
Fig. 1 is a fragmentary elevational view of the inside of a convertible automobile at the rear quarter.
Figure 3:
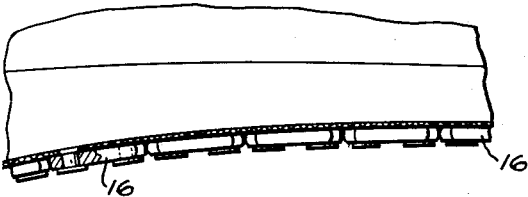
Fig. 3 is a section taken on the line 3—3 of Fig. 1.
Figure 2:
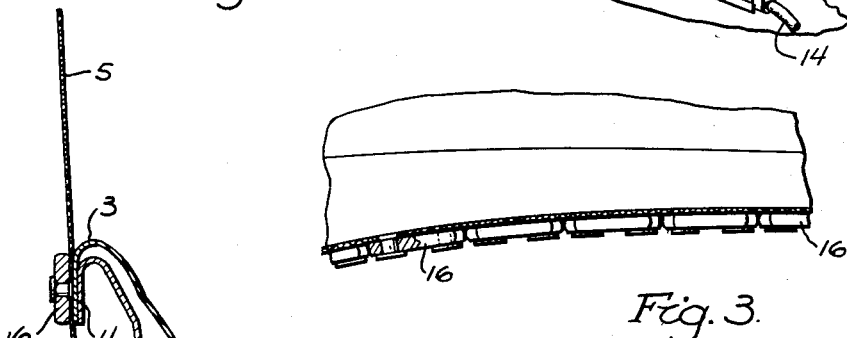
Fig. 2 is a vertical section taken at the rear quarter.
Figure 4:
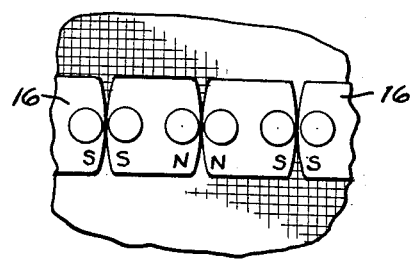
Fig. 4 is an enlarged detail showing the inside of the top material with the permanent magnets in place.

1 designates a body panel on the inside of the tonneau. 2 is the rear quarter panel whose turned in upper edge 3, together with the turned in upper edge 4 of the panel 1 forms the belt rail of the underbody or the tonneau. 5 is the folding top material. 6 is the main bow pivoted at 7 on the anchor plate 8 that is fastened to the side panel 1. It is not necessary to show the folding bow construction other than the main bow 6. A drain trough or gutter 9 is spot welded to the side panel 1 and brackets 10 are bolted to the panel 1 by bolts and nuts 11. To these brackets is clamped the folding top material 5 by means of screws 12. The top material above the drain trough has a flap 13 sewed to it so as to direct any water that drains down on the outside of the fabric into the gutter. The water runs through the gutter and out a tube 14. The top material at the rear of the tonneau is fastened thereto by a molding 15. On the side rear quarter the top material has riveted thereto a line of strong permanent magnets 16. The heads of the rivets are exposed so as to provide north and south poles to facilitate flow of the magnetic flux from the magnets to the metal of the inside of the belt rail of the car.

When the top is raised the bows spread the top material along the inside of the belt rail and then the powerful permanent magnets immediately take effect and draw the top material up against the inside of the belt rail and provide a very good seal.

Figure 5:
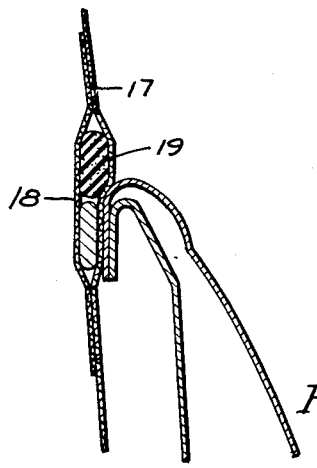
Fig. 5 is a vertical fragmentary section at the rear quarter showing a modified form of the invention.
Figure 6:
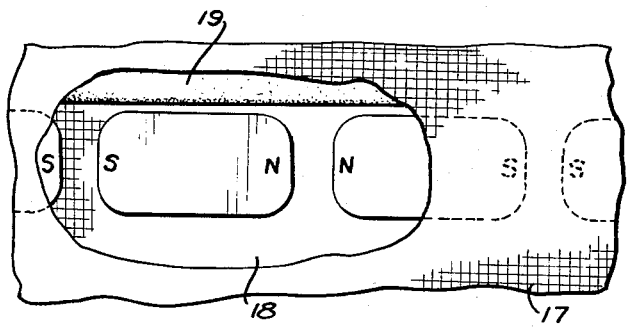
Fig. 6 is a fragmentary detail of the same with a part of the top material broken away.

In the form of the invention shown in Figs. 5 and 6 the permanent magnets are contained in an elongated pocket 17 formed by sewing a strip of top material 18 to the back of the top. The magnets here are along the bottom of the pocket and in the top of the pocket a foam rubber strip 19 is provided to provide a means for filling out the irregularities between the top material and the inside of the belt rail to improve the seal.

Figure 7:
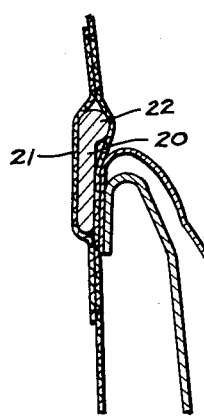
Figs. 7 and 8 are the same kind of views as Figs. 5 and 6 showing another form of the invention.
Figure 8:
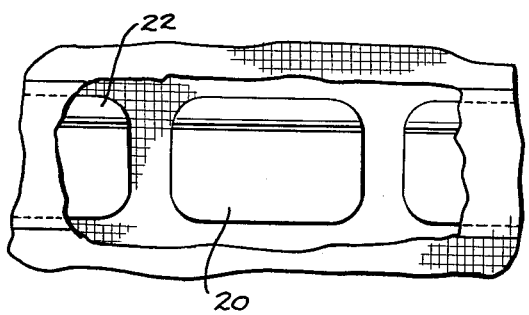

In Figs. 7 and 8 another form of the invention is shown where permanent magnets 20 are used in pocket 21. These magnets are provided with beads 22 at the top to push out the top material above the joint between the top material and the belt rail and thereby improve the seal.

Figure 9:
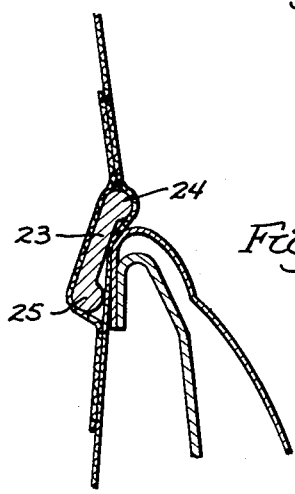
Fig. 9 is a fragmentary vertical section at the rear quarter showing another form of the invention.
Figure 10:
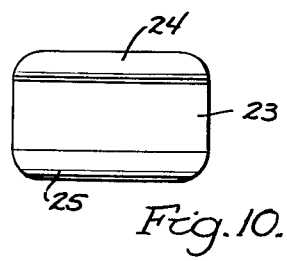
Fig. 10 is an elevation of the permanent magnet shown in Fig. 9.

In the form of the invention shown in Figs. 9 and 10 permanent magnets 23 are used which have beads 24 at the top and beads 25 at the bottom. When the top is raised and the magnets take effect, this tips the magnets as shown in Fig. 9 and improves the seal by causing the top material to be projected out beyond the joint between the top material and the belt rail and thereby facilitates the shedding of the water to the outside of the joint and causing it to flow down the outside of the rear quarter panel instead of into the joint.

What I claim is:

1. An automobile body with a convertible top having in combination an underbody or tonneau with a rear quarter structure including an outside rear quarter panel forming at the top a metal belt rail, and a folding top having the top material at the rear quarter fastened to the inside of the tonneau a considerable distance below the top, and a line of permanent magnets fastened to the flexible top material by two rivets which are exposed on the outside of the top material so as to provide poles for the passage of the magnetic flux from the magnets to the outside of the fabric, said magnets being located so that when the top is raised the magnets will be located along the inside of the belt rail and will be attracted to the metal belt rail so as to insure a seal between the top material and the belt rail.

2. An automobile body with a convertible top having in combination an underbody or tonneau with a rear quarter structure including an outside rear quarter panel forming at the top a metal belt rail, a folding top having the top material at the rear quarter fastened to the inside of the tonneau a considerable distance below the top, and magnetic sealing means for weathersealing the joint between the flexible top material and the belt rail, said magnetic sealing means comprising a line of permanent magnets fastened to the top closely adjacent each other and arranged with like poles adjacent so that the magnets oppose each other and form a continuous line of magnetic attraction between the metal rail and the magnets, said line of magnets being positioned on said flexible top so that when said top is raised, the magnets are located adjacent the metal belt rail and are attracted to said metal rail forming a continuous seal between the flexible top material and said rail.

3. The combination claimed in claim 2 in which the magnets are contained in an elongated pocket on the top material.

4. The combination claimed in claim 2 in which the permanent magnets are contained in an elongated pocket, and a strip of soft material of greater thickness than the magnets is located above the magnets, said strip forming an additional seal between the rail and the top.

5. The combination claimed in claim 2 in which the magnets are contained in an elongated pocket in the top material and each magnet has an enlargement or bead at the top to project the fabric top material out beyond the joint between the inside of the belt rail and the top material.

6. The combination claimed in claim 2 in which the magnets are contained in an elongated pocket in the top material and in which each magnet is provided with an enlargement along its upper edge and along its lower edge to form beads so that when the magnets are attracted to the inside of the belt rail the magnets are tilted to project the top material out beyond the joint between the inside of the belt rail and the top material.

CLYDE H. SCHAMEL.
HARRY A. MACKIE.

References Cited in the file of this patent

UNITED STATES PATENTS

| Number | Name | Date |
| --- | --- | --- |
| 1,624,741 | Leppke et al. | Apr. 12, 1927 |
| 2,319,292 | Boggs | May 18, 1943 |
| 2,397,931 | Ellis | Apr. 9, 1946 |
| 2,483,031 | Avedon | Sept. 27, 1949 |
| 2,569,724 | Mackie et al. | Oct. 2, 1951 |